United States Patent
Cooper et al.

(10) Patent No.: US 8,840,691 B2
(45) Date of Patent: Sep. 23, 2014

(54) PROCESS, METHOD, AND SYSTEM FOR REMOVING MERCURY FROM FLUIDS

(71) Applicants: Russell Evan Cooper, Martinez, CA (US); Dennis John O'Rear, Petaluma, CA (US); Feng-Ran Sheu, Sugar Land, TX (US); Jordan Taylor Belue, Houston, TX (US)

(72) Inventors: Russell Evan Cooper, Martinez, CA (US); Dennis John O'Rear, Petaluma, CA (US); Feng-Ran Sheu, Sugar Land, TX (US); Jordan Taylor Belue, Houston, TX (US)

(73) Assignee: Chevron U.S.A. Inc., San Ramon, CA (US)

( * ) Notice: Subject to any disclaimer, the term of this patent is extended or adjusted under 35 U.S.C. 154(b) by 0 days.

(21) Appl. No.: 14/020,293

(22) Filed: Sep. 6, 2013

(65) Prior Publication Data

US 2014/0072488 A1 Mar. 13, 2014

Related U.S. Application Data

(60) Provisional application No. 61/697,867, filed on Sep. 7, 2012, provisional application No. 61/697,855, filed on Sep. 7, 2012.

(51) Int. Cl.
*C10L 3/10* (2006.01)

(52) U.S. Cl.
USPC .................... 48/127.3; 48/127.5; 423/210

(58) Field of Classification Search
USPC ................. 48/127.3, 127.5; 423/210
See application file for complete search history.

(56) References Cited

U.S. PATENT DOCUMENTS

| | | | |
|---|---|---|---|
| 4,474,896 A * | 10/1984 | Chao | 502/216 |
| 4,591,490 A | 5/1986 | Horton | |
| 4,693,731 A | 9/1987 | Tarakad | |
| 4,701,212 A | 10/1987 | Yan | |
| 4,708,853 A | 11/1987 | Matviya | |
| 4,709,118 A | 11/1987 | Yan | |
| 4,764,219 A | 8/1988 | Yan | |
| 4,814,152 A | 3/1989 | Yan | |
| 4,874,525 A | 10/1989 | Markovs | |
| 4,892,567 A | 1/1990 | Yan | |
| 4,895,708 A | 1/1990 | Yan | |
| 4,909,926 A | 3/1990 | Yan | |
| 4,962,276 A | 10/1990 | Yan | |
| 4,982,050 A | 1/1991 | Gammie | |
| 5,034,203 A | 7/1991 | Audeh | |
| 5,037,552 A * | 8/1991 | Furuta et al. | 210/634 |
| 5,053,209 A | 10/1991 | Yan | |
| 5,141,724 A | 8/1992 | Audeh | |
| 5,190,908 A | 3/1993 | Audeh | |

(Continued)

OTHER PUBLICATIONS

Majid Abedinzadegan Abdi et al., "Amine Degradation: Problems, Review of Research Achievements, Recovery Techniques," 14 pages, Jan. 2000.

(Continued)

*Primary Examiner* — Timothy Vanoy (57) ABSTRACT

Trace levels of mercury in a natural gas are removed in a gas processing plant in an amine unit and/or a dehydrator. The mercury removal occurs concurrently with the removal of acid gases in an amine unit, e.g., an absorber or scrubber, with an amine solution containing a complexing agent. The mercury removal can also be carried out concurrently with the removal of water in a glycol dehydrator with the addition of a complexing agent to the glycol solution. Volatile mercury in the natural gas is removed by the complexing agent, forming non-volatile mercury species in the rich amine/glycol solution.

22 Claims, 2 Drawing Sheets

(56) References Cited

U.S. PATENT DOCUMENTS

| | | |
|---|---|---|
| 5,223,145 A | 6/1993 | Markovs |
| 5,271,760 A | 12/1993 | Markovs |
| 5,281,258 A | 1/1994 | Markovs |
| 5,281,259 A | 1/1994 | Markovs |
| 5,300,137 A | 4/1994 | Weyand |
| 5,322,628 A | 6/1994 | Yan |
| 5,338,444 A | 8/1994 | Van Buren |
| 5,354,357 A | 10/1994 | Markovs |
| 5,384,040 A | 1/1995 | Mank |
| 5,401,393 A | 3/1995 | Whitehurst |
| 5,419,884 A | 5/1995 | Weekman |
| 5,695,726 A | 12/1997 | Lerner |
| 5,989,506 A | 11/1999 | Markovs |
| 6,248,217 B1 | 6/2001 | Biswas |
| 6,268,543 B1 | 7/2001 | Sakai |
| 6,475,451 B1 | 11/2002 | Leppin |
| 6,537,443 B1 | 3/2003 | Frankiewicz |
| 6,576,092 B2 | 6/2003 | Granite |
| 6,579,507 B2 | 6/2003 | Pahlman |
| 6,685,824 B2 | 2/2004 | Frankiewicz |
| 6,719,828 B1* | 4/2004 | Lovell et al. ............... 95/134 |
| 6,770,250 B2 | 8/2004 | Cooper |
| 6,790,420 B2 | 9/2004 | Breen |
| 6,848,374 B2 | 2/2005 | Srinivasachar |
| 6,863,005 B2 | 3/2005 | Lanier |
| 6,872,370 B2 | 3/2005 | Cooper |
| 6,953,494 B2 | 10/2005 | Nelson, Jr. |
| 6,974,564 B2 | 12/2005 | Biermann |
| 7,033,548 B2 | 4/2006 | Pahlman |
| 7,052,661 B1 | 5/2006 | Malone |
| 7,060,233 B1 | 6/2006 | Srinivas |
| 7,381,388 B2 | 6/2008 | Cooper |
| 7,476,365 B2 | 1/2009 | Al-Faqeer |
| 7,497,172 B2 | 3/2009 | Breen |
| 7,504,081 B2 | 3/2009 | Lissianski |
| 7,544,339 B2 | 6/2009 | Lissianski |
| 7,556,672 B2 | 7/2009 | Jadhav |
| 7,563,360 B2 | 7/2009 | Yamaguchi |
| 7,572,419 B2 | 8/2009 | Cooper |
| 7,597,864 B2 | 10/2009 | Breen |
| 7,615,101 B2 | 11/2009 | Holmes |
| 7,628,969 B2 | 12/2009 | Holmes |
| 7,666,318 B1 | 2/2010 | Lehtinen |
| 7,722,843 B1* | 5/2010 | Srinivasachar ............... 423/210 |
| 7,771,700 B2 | 8/2010 | Mauldin |
| 7,833,315 B2 | 11/2010 | Lissianski |
| 7,837,962 B2 | 11/2010 | Eiteneer |
| 7,901,486 B2 | 3/2011 | Cross |
| 7,901,585 B1 | 3/2011 | Lehtinen |
| 7,955,577 B2 | 6/2011 | Comrie |
| 7,968,063 B2 | 6/2011 | Shibuya |
| 8,017,550 B2 | 9/2011 | Chao |
| 8,025,160 B2 | 9/2011 | Wang |
| 8,034,246 B2 | 10/2011 | Gustafsson |
| 8,080,156 B2 | 12/2011 | Cross |
| 8,105,423 B2 | 1/2012 | Alper |
| 8,192,528 B2 | 6/2012 | Al-Faqeer |
| 8,282,707 B2 | 10/2012 | Bresler |
| 8,312,822 B2 | 11/2012 | Holmes |
| 8,382,881 B2 | 2/2013 | Bhasin |
| 8,492,509 B2 | 7/2013 | Wang |
| 8,501,128 B2 | 8/2013 | Comrie |
| 8,535,422 B2 | 9/2013 | Via |
| 8,569,205 B2 | 10/2013 | Kuhel |
| 8,598,072 B2 | 12/2013 | Sato |
| 2002/0168302 A1 | 11/2002 | Pahlman et al. |
| 2003/0047440 A1 | 3/2003 | Granite |
| 2003/0103882 A1 | 6/2003 | Biermann |
| 2003/0116475 A1 | 6/2003 | Frankiewicz |
| 2003/0118493 A1 | 6/2003 | Cooper |
| 2003/0143128 A1 | 7/2003 | Lanier et al. |
| 2003/0147793 A1 | 8/2003 | Breen |
| 2004/0003716 A1 | 1/2004 | Nelson, Jr. |
| 2004/0081606 A1 | 4/2004 | Cooper |
| 2004/0134396 A1 | 7/2004 | Lanier |
| 2004/0144250 A1* | 7/2004 | Neuroth et al. ............... 95/133 |
| 2004/0223896 A1 | 11/2004 | Cooper |
| 2004/0244657 A1 | 12/2004 | Srinivasachar |
| 2005/0129600 A1 | 6/2005 | Lanier |
| 2005/0161370 A1 | 7/2005 | Carnell |
| 2005/0167335 A1 | 8/2005 | Yamaguchi |
| 2005/0274307 A1 | 12/2005 | Lissianski |
| 2006/0011115 A1 | 1/2006 | Breen |
| 2006/0051270 A1 | 3/2006 | Brunette |
| 2006/0120934 A1 | 6/2006 | Lanier |
| 2007/0051239 A1 | 3/2007 | Holmes |
| 2007/0156288 A1 | 7/2007 | Wroblewski |
| 2007/0234902 A1 | 10/2007 | Fair |
| 2007/0246401 A1 | 10/2007 | Al-Faqeer |
| 2008/0028932 A1 | 2/2008 | Biermann |
| 2008/0041227 A1 | 2/2008 | Mulvaney III et al. |
| 2008/0056973 A1 | 3/2008 | Schofield |
| 2008/0121142 A1 | 5/2008 | Comrie |
| 2008/0241027 A1 | 10/2008 | Lissianski |
| 2008/0241029 A1 | 10/2008 | Lissianski |
| 2008/0302730 A1 | 12/2008 | Wang |
| 2009/0007785 A1 | 1/2009 | Kimura |
| 2009/0029447 A1 | 1/2009 | Squire |
| 2009/0032472 A1 | 2/2009 | Krogue |
| 2009/0071073 A1* | 3/2009 | Al-Faqeer ............... 48/127.3 |
| 2009/0104097 A1 | 4/2009 | Dunson, Jr. |
| 2009/0145343 A1 | 6/2009 | Mauldin |
| 2009/0155148 A1 | 6/2009 | Kanazirev |
| 2009/0211444 A1 | 8/2009 | Lissianski |
| 2009/0235848 A1 | 9/2009 | Eiteneer |
| 2009/0272267 A1 | 11/2009 | Nelson |
| 2010/0000409 A1 | 1/2010 | Alper |
| 2010/0025184 A1 | 2/2010 | Shibuya |
| 2010/0025302 A1 | 2/2010 | Sato |
| 2010/0032345 A1 | 2/2010 | Cross |
| 2010/0083830 A1 | 4/2010 | Cross |
| 2010/0126909 A1 | 5/2010 | Bhasin |
| 2010/0147745 A1 | 6/2010 | Den Boestert |
| 2010/0251938 A1 | 10/2010 | Comrie |
| 2011/0000855 A1 | 1/2011 | Kuhel |
| 2011/0174016 A1 | 7/2011 | Carnell |
| 2011/0203499 A1 | 8/2011 | Comrie |
| 2011/0223088 A1 | 9/2011 | Chang |
| 2011/0226700 A1 | 9/2011 | Hetherington |
| 2011/0226989 A9 | 9/2011 | Seeker |
| 2011/0312491 A1 | 12/2011 | Chao |
| 2011/0315013 A1 | 12/2011 | Wang |
| 2012/0000359 A1 | 1/2012 | Bresler |
| 2012/0017639 A1 | 1/2012 | Peterson |
| 2012/0103912 A1 | 5/2012 | Hetherington |
| 2012/0121485 A1 | 5/2012 | Rogers |
| 2012/0272872 A1* | 11/2012 | Lesniak et al. ............... 106/819 |
| 2012/0272877 A1 | 11/2012 | Comrie |
| 2012/0322696 A1 | 12/2012 | Hayes |
| 2013/0034479 A1 | 2/2013 | Holmes |
| 2013/0090505 A1 | 4/2013 | Catchpole |
| 2013/0139526 A1 | 6/2013 | Jariwala |
| 2013/0152788 A1 | 6/2013 | Turbeville |
| 2013/0168293 A1 | 7/2013 | O'Rear |
| 2013/0213223 A1 | 8/2013 | Posa |
| 2013/0272936 A1 | 10/2013 | Nalepa |
| 2013/0306310 A1 | 11/2013 | Gallup |
| 2013/0306311 A1 | 11/2013 | Cooper |
| 2013/0306312 A1 | 11/2013 | O'Rear |
| 2013/0306521 A1* | 11/2013 | O'Rear et al. ............... 208/251 R |
| 2014/0042362 A1* | 2/2014 | McGarvey et al. ............... 252/189 |

OTHER PUBLICATIONS

Peter J.H. Carnell, et al. "Mercury matters," Reprinted from Hydrocarbon Engineering, 3 pages, Dec. 2005.
S. Chiarle et al., "Mercury Removal From Water By Ion Exchange Resins Adsorption," *Wat. Res.* vol. 34, No. 11, pp. 2971-2978, 2000.
Jeriffa De Clercq, "Removal of mercury from aqueous solutions by adsorption on a new ultra stable mesoporous adsorbent and on a commercial ion exchange resin," International Journal of Industrial Chemistry (IJIC), 6 pages, 2012.
DOW Brochure, Technical Information—Gas Treating Products & Services, Form No. 170-00284-0704, 4 pages, Jul. 2004.

(56) References Cited

OTHER PUBLICATIONS

Randy Haws, "Contaminants in Amine Gas Treating," CCR Technologies Inc., 13 pages.

Hong Meng et al., "Removal of heat stable salts from aqueous solutions of N-methyldiethanolamine using a specially designed three-compartment configuration electrodialyzer," *Journal of Membrane Science* 322, 2008, pp. 436-440.

Vince Atma Row et al., "The impact of mercury on gas processing plant assets and its removal," Johnson Matthey Catalysts Process Catalysts and Technologies, 8 pages.

Y. Song et al., "Effect of $O_2$ and Temperature on Sour Corrosion" ISSN 0010-9312, NCAE International, Jul. 2012, 10 pages.

James G. Speight, "Petroleum Refinery Processes," Kirk-Othmer Encyclopedia of Chemical Technology, John Wiley & Sons, Inc. Aug. 19, 2005, 49 pages.

John C. Polasek et al., "Using Mixed Amine Solutions for Gas Sweetening" Bryan Research & Engineering, Inc., 2006, 10 pages.

James A. Anabtawi, et al., "Reaction of Trace Mercury in Natural Gas with Dilute Polysulfide Solutions in a Packed Column," *Ind. Eng. Chem. Res.*, 1991, 30 pp. 2592-2595.

\* cited by examiner

PROCESS, METHOD, AND SYSTEM FOR REMOVING MERCURY FROM FLUIDS

CROSS-REFERENCE TO RELATED APPLICATIONS

This application claims benefit under 35 USC 119 of U.S. Provisional Patent Application Nos. 61/697,867 and 61/697,855 with a filing date of Sep. 7, 2012.

TECHNICAL FIELD

The invention relates generally to a process, method, and system for removing heavy metals such as mercury from hydrocarbon fluids such as natural gas.

BACKGROUND

Exploration and production of deeper, lower quality oil and gas reserves has challenged refiners and gas processors with feedstocks having significantly higher sulfur content, increasing corrosion risks and other undesired impurities. Amine units for amine gas treating (also known as "gas sweetening" or "acid gas removal") refers to a group of processes or units that use aqueous solutions of various alkanolamines (commonly referred to simply as amines) for the removal of $H_2S$ and $CO_2$ from gases. The removal is driven by either required product specification, e.g., natural gas that contains less than 4 ppm $H_2S$, or by environmental permission requirements, and/or by the minimization of corrosion problem of process equipment.

Amine treating units are commonly used in refineries as well as in petrochemical plants, natural gas processing plants, and other industries, for the removal of $H_2S$ and $CO_2$ from gases. When volatile mercury is present in the gases to the amine units, it will appear in the products from the units, e.g., the sweetened gas (after removal of $H_{2S}$ and $CO_2$) and rich amine containing $H_2S$ and $CO_2$. Mercury, $CO_2$ and $H_2S$ are to be removed from the sweetened gas. Mercury in these products can impact the operations downstream from the amine units.

Glycol dehydrators are sometimes used in to dry natural gas, e.g., the sweetened gas from the amine unit, to specifications. The glycol absorbs the moisture forming a dry gas. Wet glycol is recycled by vaporizing water at low pressure and at elevated temperatures. Methane and other hydrocarbons are somewhat soluble in triethylene glycol, particularly at high pressure and ambient temperature. These hydrocarbons are vaporized from the glycol as the pressure is reduced and temperature is increased. If mercury is present in the natural gas, a portion can appear in either the dry gas or vent to the atmosphere from glycol dehydrators.

Absorbers have been used in the prior art to remove heavy metals such as mercury from the sweetened gas to specifications, e.g., 0.1 $\mu g/m^3$, with the use of an adsorbent bed of carbon, zeolite, or supported metals known in the art. The adsorbents are rather expensive and require disposal as a hazardous waste, or shipped to a re-processing facility.

There is still a need for improved methods and systems to remove volatile mercury from fluids such as natural gas, vent gas or flue gas, allowing for the optimization of plant operations to minimize the equipment corrosion, mercury emission and any HES risks associated with mercury.

SUMMARY

In one aspect, the invention relates to a method to remove mercury from a gas feed. The method comprises: providing a gas feed to a dehydrator, the gas feed containing acid gases, a first concentration of volatile mercury and water, contacting the gas feed with a glycol solution containing a complexing agent in the dehydrator, generating a dehydrated gas stream with a reduced concentration of water and mercury; and wherein mercury and water are concurrently removed from the gas feed for a rich glycol containing at least 50% of the volatile mercury in the gas feed as non-volatile mercury. In one embodiment, the method further comprises: heating the rich amine solution containing mercury and acid gases in a solvent regeneration process employing at least a stripper and a reboiler, generating a lean amine containing non-volatile mercury for recycle in an absorber to remove acid gases.

In a second aspect, a method for removing a trace amount of mercury in a natural gas feed is provided. The method comprises: providing a gas feed containing acid gases, a first concentration of volatile mercury and water, contacting the gas feed with a glycol solution in a dehydrator, the glycol solution containing a complexing agent for the glycol solution to concurrently remove the volatile mercury and water from the gas feed, for a rich glycol containing at least 50% of the volatile mercury in the gas feed as non-volatile mercury, generating a dehydrated gas stream having a reduced concentration of water and mercury, removing the non-volatile mercury from the rich glycol by at least one of filtration, centrifugation, precipitation, stripping, distillation, adsorption, ion exchange, electrodialysis, a hydrocarbon steam and separation step, and combinations thereof, generating a recycled glycol stream having a reduced concentration of mercury of less than 50% of the non-volatile mercury in the rich glycol.

In a third aspect, a method of removing mercury from a gas feed is provided, the method comprises the steps of: contacting the gas feed with an absorption solution in an absorber, the absorption solution comprising lean amine and a first complexing agent, wherein the absorption solution concurrently removes mercury and acid gases from the gas feed generating a rich amine solution containing mercury and acid gases and a treated gas stream containing water vapor and a reduced concentration of acid gases and a second concentration of mercury, and wherein the second concentration of mercury is less than 50% of the first concentration of mercury; contacting the treated gas stream with a glycol solution in a dehydrator, wherein the glycol solution contains a second complexing agent for the glycol solution to concurrently remove mercury and water vapor from the treated gas stream, generating a rich glycol containing non-volatile mercury and a dehydrated gas stream with a reduced concentration of water and a third concentration of mercury, wherein the third concentration of mercury is less than 50% of the second concentration of mercury.

In yet another aspect, a method for removing mercury from a gas feed is provided. The method comprises: providing a gas feed containing a first concentration of volatile mercury and acid gases; contacting the gas feed in an absorber with an absorption solution comprising lean amine and a first complexing agent comprising volatile cations selected from ammonium polysulfide, amine polysulfides, and sulfanes, wherein the absorption solution concurrently removes mercury and non-volatile mercury and acid gases from the gas feed; generating a rich amine solution containing acid gases and at least 50% of the volatile mercury in the gas feed as non-volatile mercury and a treated gas stream with a second concentration of acid gases and mercury.

DETAILED DESCRIPTION

The following terms will be used throughout the specification and will have the following meanings unless otherwise indicated.

"Trace amount" refers to the amount of mercury in the natural gas. The amount varies depending on the natural gas source, ranging from a few $\mu g/Nm^3$ to up to 30,000 $\mu g/Nm^3$.

"Volatile mercury" refers to mercury that is present in the gas phase of well gas or natural gas. Volatile mercury is primarily elemental mercury)($Hg^0$) but may also include some other mercury compounds (organic and inorganic mercury species).

"Mercury sulfide" may be used interchangeably with HgS, referring to mercurous sulfide, mercuric sulfide, and mixtures thereof. Normally, mercury sulfide is present as mercuric sulfide with an approximate stoichiometric equivalent of one mole of sulfide ion per mole of mercury ion. Mercury sulfide is not appreciably volatile, and not an example of volatile mercury. Crystalline phases include cinnabar, metacinnabar and hypercinnabar with metacinnabar being the most common.

"Sulfane" refers to a hydrogen-sulfur complex of the formula $H_2S_x$, where x>=2. For purposes of this disclosure, hydrogen sulfide is not a sulfane.

"Wet gas" refers to natural gas that contains less methane (e.g., less than 85%) and more ethane and other more complex hydrocarbons.

"Amine" refers to amines for use in gas treating, including but not limited to monoethanolamine (MEA), diethanolamine (DEA), methyldiethanolamine (MDEA), aminoethoxyethanol(diglycoamine) (DGA), triethanolamine (TEA), diisopropylamine (DIPA), proprietary amines known in the art and commercially available, and mixtures thereof. The most commonly used amines are the alkanolamines such as MEA, DEA, and MDEA.

"Acid gas" refers to the product gas from an amine unit that contains acidic impurities, e.g., $H_2S$, $CO_2$, $SO_2$ and $SO_2$ ($SO_x$), NO and $NO_2$ ($NO_2$), chlorine, etc. In one embodiment, the acid gas is chemically absorbed in the liquid (solution or fluid). In another embodiment, the acid gas is dissolved in the liquid, e.g., an aqueous amine solution.

"Amine unit" refers to a process or a group of processes using aqueous solutions of various amines to remove hydrogen sulfide (H2S) and carbon dioxide (CO2) from gases. Amine unit can be located in refineries, petrochemical plants, natural gas processing plants and other industries. It is also known as "gas sweetening" or "acid gas removal" unit.

"Acid gas" refers to natural gas or any other gas mixture containing hydrogen sulfide ($H_2S$), carbon dioxide ($CO_2$), or similar acidic gases.

"Sour gas" refers to natural gas or flue gas prior to treatment, which contains acid gas and trace amounts of mercury as volatile mercury.

"Rich amine" refers to the aqueous amine solution containing absorbed acid gas.

"Lean amine" refers to the amine after being regenerated by steam stripping to remove the absorbed acid gases and produce regenerated amine solution for use in the absorber to treat sour gas.

"Sweetened gas" or "sweet gas" refers to a sour gas stream after treatment in an amine unit, after absorption/removal of acid gas by an amine solution, and flows overhead from the absorber (scrubber or amine contactor).

In the sections that follow, the reference to "amine" is by way of exemplification only for a solute in which an acid gas is chemically absorbed and can be subsequently released. Similarly, the reference to "$H_2S$" is by way of exemplification only for an acid gas that can be chemically absorbed in a liquid system, e.g., amine, sour water, and can be subsequently released, and does not exclude other acid gases or mixtures thereof, e.g., mixture of $H_2S$ and $CO_2$, mixture of $SO_2$, $NO_2$, chlorine.

Generally, natural gas streams comprise low molecular weight hydrocarbons such as methane, ethane, propane, other paraffinic hydrocarbons that are typically gases at room temperature, etc. Mercury is present in natural gas as volatile mercury, including elemental mercury $Hg^0$, in levels ranging from about 0.01 $\mu g/Nm^3$ to 5000 $\mu g/Nm^3$. The mercury content may be measured by various conventional analytical techniques known in the art, including but not limited to cold vapor atomic absorption spectroscopy (CV-AAS), inductively coupled plasma atomic emission spectroscopy (ICP-AES), X-ray fluorescence, or neutron activation. If the methods differ, ASTM D 6350 is used to measure the mercury content.

The invention relates to an improved method and a system to remove heavy metals such as mercury present in natural gas feedstock, e.g., wet gas feed, in a gas processing plant. The term "gas processing plant" may be used interchangeably with "gas production facility." The mercury removal is carried out in the amine treating unit and/or the gas dehydration unit of with the use of a complexing agent.

Figure 1:
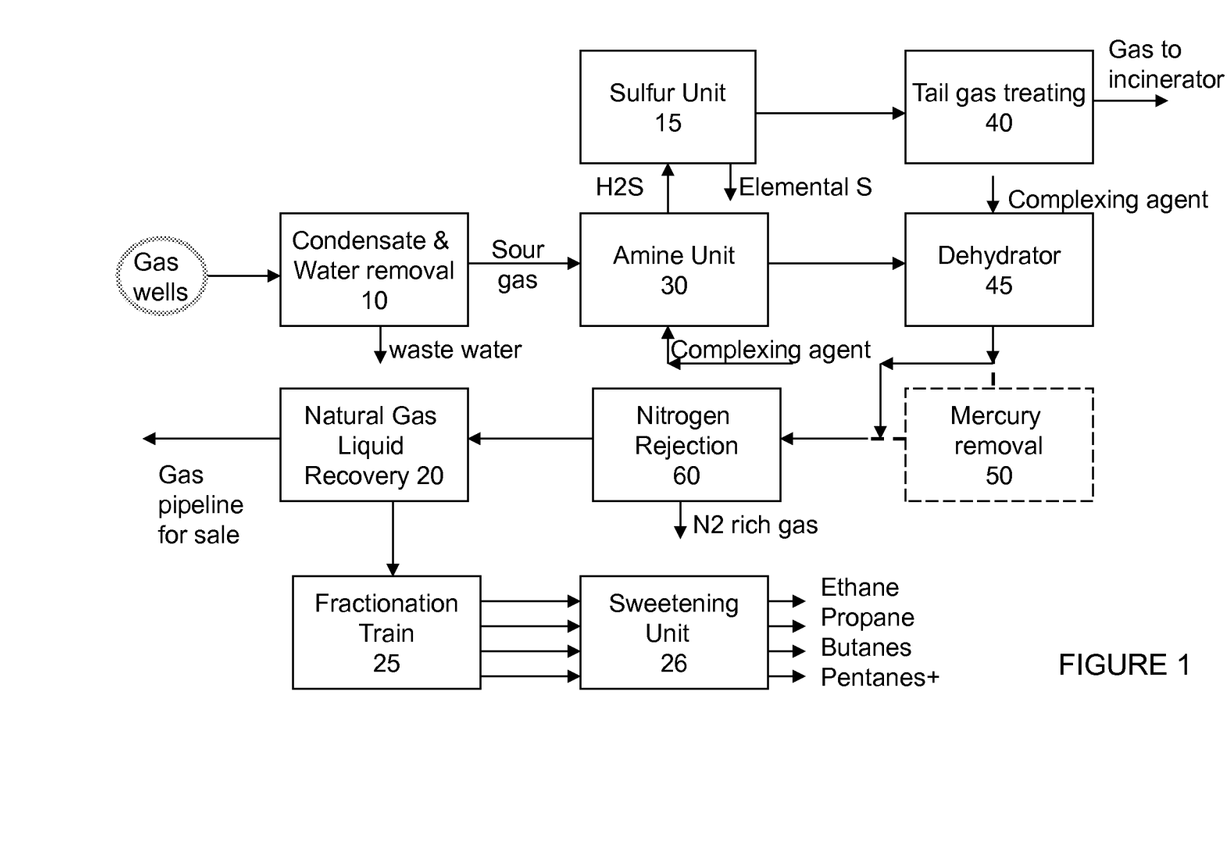
FIG. 1 is a diagram illustrating an embodiment of a gas processing plant.

Gas Processing Plant:

FIG. 1 is a schematic diagram illustrating the various processes within a typical natural gas processing plant. Natural gas collected from gas wells is first processed in step 10 for the removal of liquid water and natural gas condensate, generating a gas feed which typically contains acid gases and water vapor, which is typically referred to as a sour gas. The initial water removal step can be done at the processing plant, or it can be at the collection point.

In amine unit 30, the sour gas feed is purified with the removal of acid gases by absorption with an amine solution, generating a gas stream with reduced concentration of acid gases. The acid gases can be routed into a sulfur recovery unit 15 to recover elemental sulfur. The residual gas is processed in the tail gas treating unit 40.

The sweetened gas having a reduced concentration of acid gases is routed to dehydrator 40, where a solution such as glycol is used to remove water vapor by absorption. In the mercury removal unit (MRU) 50, mercury is then removed by adsorption using activated carbon or other adsorbents known in the art. After the MRU, nitrogen is optionally removed in process step 60 in a cryogenic or adsorption process. The residue gas from the natural gas liquid (NGL) recovery process 20 is the final purified gas which can be pipelined to the end-user market, or optionally sent to a fractionation train 25 with distillation towers to generate various products such as propane, butane, C5+, etc. The various gases can also be sweetened in unit 26 with the removal of mercaptans, prior to being pipelined to the end-user market.

In terms of the average distribution of mercury in a typical gas processing plant as shown in FIG. 1, it has been shown that out of 100% of mercury entering the plant, 90% goes to the amine unit as sour gas feed. Of this 90%, proportionally 70% goes to the sour gas product stream (i.e., to the sulfur unit), and 30% stays in the sweetened gas stream. The sweetened gas stream goes to the gas dehydration unit, e.g., a glycol dehydrator, wherein proportionally 20% leaves with the vented moisture stream, and 80% leaves in the dry gas. If not removed with a MRU, mercury can appear in other process streams. It has been recommended that mercury be removed upstream of the process steps in a gas processing plant. The invention relates to the removal of heavy metals such as mercury from feed to a gas processing plant. In one embodiment as illustrated in FIG. 1 with the mercury removal unit (MRU) being made optional (as dotted lines), mercury removal is carried out in the amine unit concurrent with the removal of acid gas from the sour gas feed with the addition of a complexing agent to the amine solution. In another embodiment, mercury removal is carried out concurrently with the removal of water in a gas dehydration unit (in addition to or instead of the amine unit), with the addition of a complexing agent to the glycol solution. The complexing agent for the mercury removal can be generated on-site, e.g., manufacture of polysulfide solutions from elemental sulfur and sulfidic solutions, or the manufacture of sodium sulfide solutions from sodium carbonate and sulfur sources if available on site.

Mercury Removal in Amine Unit:

In one embodiment for mercury removal in an amine treating unit, (lean) amine scrubbing solution is used to remove acid gases such as hydrogen sulfide ($H_2S$) and carbon dioxide from the sour feed steam in an absorber, generating a rich amine stream. A sufficient amount of a complexing agent is added to the absorber for the removal of mercury concurrently with the removing of acid gases from the sour feed stream by the amine scrubbing solution. The complexing agent coverts at least a portion of the volatile mercury in the sour gas feed into a non-volatile form, extracted from the gas phase into the amine scrubbing solution.

The amount of amine in the scrubbing solution feed to the absorber depends on the amount of acid gases in the natural gas to be treated (acid loadings), and based on the moles of $H_2S$ (and/or $CO_2$) per mole of amine in solution. In one embodiment, the ratio of absorbed acid gases to amine ranges from 0.3 to 0.9. Examples of amines suitable for use in the scrubbing solution include but are not limited to MEA, DEA, TEA, DIPA, MDEA, and mixtures thereof. The concentration of amines in the scrubbing solution varies depending on the amine type, and the acid gases for removal, e.g., $H_2S$ and $CO_2$ or removing $CO_2$ only, etc. The amine concentration (as wt. % of pure amine in the aqueous solution) ranges from 15-65% in one embodiment, from 20-55% in a second embodiment, and from 25-45% in a third embodiment. In one embodiment, the scrubbing solution further comprises absorption promoters and other additives, e.g., piperazine.

The complexing agent is added to the lean amine feed to the absorber in one embodiment; as a separate feed stream to the absorber in a second embodiment; and as the same feed with the make-up water stream to the absorber in a third embodiment. The complexing agent is added in an amount of less than 5 vol. % of total scrubbing solution in the amine absorber in one embodiment; less than 3 vol. % in a second embodiment; less than 1 vol. % in a third embodiment; and less than 0.5 vol. % in a third embodiment.

In one embodiment to prevent contamination of the amine in the amine absorber, the complexing agent contains little if any non-volatile alkali metals or alkali earth cations (none purposely added), e.g., with no sodium polysulfide or other sodium salts, as the sodium cation will accumulate in the amine recycle and degrade its performance. In one embodiment, the complexing agent is selected from the group of volatile cations, which can be removed in the regenerator. Examples of volatile cations include but are not limited to ammonium, amines and hydrogen cations, e.g., ammonium polysulfide, amine polysulfides, and sulfanes.

Mercury Removal in Dehydrator Unit:

In another embodiment, mercury removal is carried out in the dehydrator unit ("dehydrator") in addition to, or in place of mercury removal in the amine unit. The dehydrator can be tray columns or packed columns in one embodiment. In a dehydrator, a liquid desiccant dehydrator such as glycol serves to absorb water vapor from the gas stream. Glycol has a chemical affinity for water, upon contact with a stream of natural gas that contains water in a dehydrator (e.g., a contactor, an absorber, etc.), will serve to 'steal' the water out of the gas stream. Upon exiting the dehydrator, the glycol stream containing water (and mercury) is referred to as "rich glycol."

The glycol solution typically involves either diethylene glycol (DEG) or triethylene glycol (TEG). In one embodiment, the glycol solution is employed in a concentration ranging from 99.1% up to 99.95% wt, in an amount sufficient to strip water at a rate of 0.5-6 scf of gas feed/gallon of glycol, for a dehydrated gas having water specifications of less than 1 lb./MMSCF (Million Standard Cubic Feet).

The dehydrated gas having been stripped of most of its water content has a concentration of less than 100 $\mu g/Nm^3$ mercury in one embodiment; less than 10 $\mu g/Nm^3$ mercury in a second embodiment; less than 1 $\mu g/Nm^3$ in a third embodiment; and less than 0.1 $\mu g/Nm^3$ mercury in a fourth embodiment. The dehydrated gas is further processed, e.g., nitrogen injection, NGL recovery, fractionation, etc.

In one embodiment, the complexing agent is added as part of the glycol solution feed to the dehydrator. In another embodiment, it is added as a separate feed stream to the dehydrator. The complexing agent is added in an amount of less than 5 vol. % of total glycol solution to the dehydrator in one embodiment; less than 3 vol. % in a second embodiment; less than 1 vol. % in a third embodiment; and less than 0.5 vol. % in a third embodiment.

Complexing Agent:

"Complexing agent" refers to a material or compound that is capable of extracting volatile mercury in natural gas into the liquid phase, forming non-volatile mercury complexes. Examples of non-volatile mercury complexes include HgS and soluble mercury sulfur compounds (e.g. $HgHS_2^-$ or $HgS_2^{2-}$).

Examples of complexing agents include but are not limited to water-soluble sulfur species, e.g., sulfides, hydrosulfides, and polysulfides, for extracting mercury in natural gas into the aqueous phase as precipitate (e.g., HgS) or soluble mercury sulfur compounds (e.g. $HgS_2^{2-}$). Examples of water-soluble sulfur compounds include amine polysulfides, sodium hydrosulfide, potassium hydrosulfide, ammonium hydrosulfide, sodium sulfide, potassium sulfide, calcium sulfide, magnesium sulfide, ammonium sulfide, sodium thiocarbamate, sodium dithiocarbamate, ammonium thiocarbamate, ammonium dithiocarbamate, and mixtures thereof. Aqueous source containing water-soluble sulfur species can be any of purchased or produced reagent solutions, sulfidic water, sulfidic waste water, kraft caustic liquor, kraft carbonate liquor, etc.

Other examples of complexing agents that can be used for the removal of mercury from the amine unit includes mercaptans, organic polysulfides (compounds of the general formula $R-S_X-R'$ where x is greater than 1 and R and R' are alkyl or aryl groups), sulfanes and combinations thereof.

The amount of complexing agents to be added to the amine scrubbing solution and/or the glycol solution is determined by the effectiveness of complexing agent employed. The complexing agent to be added to the amine scrubbing solution can be the same or different from the complexing agent added to the glycol solution. The amount is at least equal to the amount of mercury in the gas on a molar basis (1:1), if not in an excess amount. In one embodiment, the molar ratio ranges from 5:1 to 10,000:1. In another embodiment, from 10:1 to 5000:1. In yet another embodiment, a molar ratio of sulfur additive to mercury ranging from 50:1 to 2500:1. In one embodiment with the use of a water-soluble sulfur compound as a scrubbing agent, a sufficient amount of the complexing agent is added to the amine scrubber for a sulfide concentration ranging from 0.05 M to 10M in one embodiment; from 0.1M to 5M in a second embodiment; from 0.3M to 4M in a third embodiment; and at least 0.5M in a fourth embodiment. If the mercury complexing agent is an organic polysulfide, sulfane or mercaptan, the moles of complexing agent are calculated on the same basis as the amount of sulfur present.

In one embodiment, the complexing agent is an inorganic polysulfide such as sodium polysulfide, for an extraction of mercury from the natural gas according to equation: $Hg(g)+Na_2S_x(aq)+H_2O \rightarrow HgS_2H^-(aq)+Na_2S_{x-2}(aq)+OH^-(aq)$, where (g) denotes the mercury in the gas phase, and (aq) denotes a species in water. The charges are balanced by other species. Solid HgS is not formed and the mercury remains in solution as an anionic species. In another embodiment, the complexing agent is a compound with a relatively high boiling point, e.g., not too volatile and above 100° C. in one embodiment and above 125° C. in another embodiment. If not, the complexing agent would be lost in the stripping operation for the removal of adsorbed acid gas from the acid gas scrubbing solution. In yet another embodiment the complexing agent is sodium sulfide. Sodium sulfide and other complexing agents may promote the removal of mercury from gas streams containing high $CO_2$ concentrations but low $H_2S$ concentrations. In yet another embodiment the complexing agent is hydrogen sulfide ($H_2S$) or a combination of hydrogen sulfide and one or more of the above-mentioned complexing agents.

In one embodiment, the complexing agent is added to the absorber (scrubber) and/or the contactor (dehydrator), allowing the extraction of volatile mercury from the sour gas feed into the scrubbing solution of rich amine or the glycol solution, for a sweetened gas stream having a reduced concentration of acid gas as well as a mercury concentration of less than 50% of the mercury originally present in one embodiment (at least 50% mercury removal). In another embodiment, the sweetened gas contains less than 10% of the original mercury level (at least 90% removal). In a third embodiment, less than 5% of the original level (at least 95% removal). The mercury content in the sweetened gas stream will depend on the mercury content of the feed and the percent removal. The mercury content is reduced to below 100 μg/Nm³ in one embodiment, less than 10 μg/Nm³ in a second embodiment, less than 1 μg/Nm³ in a third embodiment, and less than 0.1 μg/Nm³ in a fourth embodiment.

In one embodiment with the addition of complexing agent to the dehydrator, the glycol solution leaving the dehydrator unit contains at least 50% of the mercury initially present in the gas feed (to the dehydrator). The solution contains at least 75% of the mercury originally present in a second embodiment; and at least 90% in the third embodiment.

Optional Additives:

In one embodiment in addition to the complexing agent, at least one of an anti-foam and/or a demulsifier is added to the glycol solution. As used herein, the term anti-foam includes both anti-foam and defoamer materials, for preventing foam from happening and/or reducing the extent of foaming. Additionally, some anti-foam material may have both functions, e.g., reducing/mitigating foaming under certain conditions, and preventing foam from happening under other operating conditions. Anti-foam agents can be selected from a wide range of commercially available products such as silicones, e.g., polydimethyl siloxane (PDMS), polydiphenyl siloxane, fluorinated siloxane, etc., in an amount of 1 to 500 ppm.

In one embodiment, at least a demulsifier is added in a concentration from 1 to 5,000 ppm. In another embodiment, a demulsifier is added at a concentration from 10 to 500 ppm. In one embodiment, the demulsifier is a commercially available demulsifier selected from polyamines, polyamidoamines, polyimines, condensates of o-toluidine and formaldehyde, quaternary ammonium compounds and ionic surfactants. In another embodiment, the demulsifier is selected from the group of polyoxyethylene alkyl phenols, their sulphonates and sodium sulphonates thereof. In another embodiment, the demulsifier is a polynuclear, aromatic sulfonic acid additive.

In another embodiment, in addition to the complexing agent and optionally at least a demulsifier/anti-foam agent, an oxygen scavenger is preferably added to any of the glycol solution, the amine solution, and the absorbent. The oxygen scavenger may be present in an amount ranging from 0.001 to 1 wt. %, based on the weight of the glycol solution, lean amine, or absorbent. As dissolved oxygen in the amine or glycol storage tank would lead to corrosion of iron surfaces, or react with the feed gas making heat stable salts which are difficult to separate in the regeneration step, the oxygen scavenger removes traces of dissolved oxygen present, minimizing corrosion impact.

Examples of oxygen scavengers include bisulfites, metabisulfites, hydrazine salts, hydroxylamine salts, guanidine salts, N,N-Diethylhydroxylamine, oximes, dithionites, ascorbic acid, and isoascorbic acid. The anion salts of these oxygen scavengers can be chlorides, sulfates, and other suitable anions. The cations associated with the oxygen scavengers can be sodium, potassium or volatile cations as described for the complexing agents. Volatile cations are preferred when they are used in an amine unit.

A compatible oxygen scavenger is one that does not react with the mercury complexing agent and reduce its effectiveness for mercury capture. Examples of oxygen scavengers that react with a complexing agent such as polysulfide include bisulfites and metabisulfite. In one embodiment, the oxygen scavenger is selected for compatibility with the mercury complexing agent. Examples of compatible oxygen scavengers include: hydrazine salts, guanidine salts, N,N-Diethylhydroxylamine, oximes, dithionites, ascorbic acid, and isoascorbic acid.

Recovery/Regeneration of Amine Solution:

In one embodiment for the concurrent mercury removal from the absorber, the resultant rich amine containing non-volatile mercury and acid gases from the absorber is routed into the regenerator. In the regenerator ((a stripper with a reboiler), a "lean" amine containing non-volatile mercury is regenerated for recycle/subsequent reuse in the absorber to remove acid gases. With the regeneration of the lean amine for use in the absorber unit, mercury will gradually build up over time in the system, along with other known solid and ionic materials which accumulate in acid gas scrubbing solutions and are commonly known as "heat stable salts" or HSS.

In one embodiment, the regenerator overhead gas undergoes further processing in a sulfur unit, e.g., to make sulfuric acid from the acid gas $H_2S$, or combusted for subsequent venting. Removal of the mercury in the amine absorber gives an acid gas product with reduced mercury. This enables the production of sulfuric acid, or elemental sulfur, with reduced mercury. In another embodiment, the regenerator overhead gas is first routed through a condenser set up for the removal of water by condensation, then subsequently sent to a mercury removal unit (MRU) for the removal of mercury using processes and equipment known in the art.

In one embodiment, a portion of the mercury-containing amine adsorbent can be continuously or intermittently purged from the amine unit/removed from the scrubber, and replaced with fresh amine. In yet another embodiment, other remediation actions include: a) the contaminated amine solution is purged (bled) on a continuous or intermittent basis and replaced with fresh amine; b) the entire inventory of amine is replaced; and c) reclaiming the solution. Reclaiming the solution to remove non-volatile mercury as removed from the natural gas feed to the amine unit can be done by a variety of processes and systems known in the art for the removal of heat stable salts, including but not limited to filtration, centrifugation, precipitation, reduction to elemental mercury followed stripping, distillation, adsorption, ion exchange, electrodialysis, or transfer to a hydrocarbon steam and separation, and combinations thereof.

Recovery/Regeneration of Glycol Solution:

In one embodiment after the concurrent removal of water and mercury in the dehydrator, the rich glycol bearing non-volatile mercury and water stripped from the natural gas, is put through a specialized boiler designed to vaporize only the water out of the solution. While water has a boiling point of 212° F., glycol does not boil until 400° F. This boiling point differential makes it relatively easy to remove water from the rich glycol, allowing it be reused in the dehydration process. Depending on the temperature of the distillation, e.g., below than 150° C., in one embodiment, mercury remains in the rich glycol bottom, with water going overhead in the glycol regenerator. In another embodiment with the distillation at a lower temperature, e.g., above 150° C., mercury can be removed from the bottom stream by techniques known in the art such as ion-exchange or sub-atmospheric pressure distillation.

In another embodiment, residual mercury in the rich glycol can be removed by other processes known in the art, including but are not limited to filtration, centrifugation, precipitation, reduction to elemental mercury followed stripping, distillation, adsorption, ion exchange, or transfer to a hydrocarbon steam and separation, and combinations. Alternatively a portion of the mercury-containing rich glycol stream can be purged from the system. In one embodiment, the non-volatile mercury complexes can be removed from the regenerated/recycled rich glycol with the use of a mercury absorber containing a bed of sulphided absorbent as disclosed in U.S. Pat. No. 7,435,338, the relevant disclosure is incorporated herein by reference.

Figure 2:
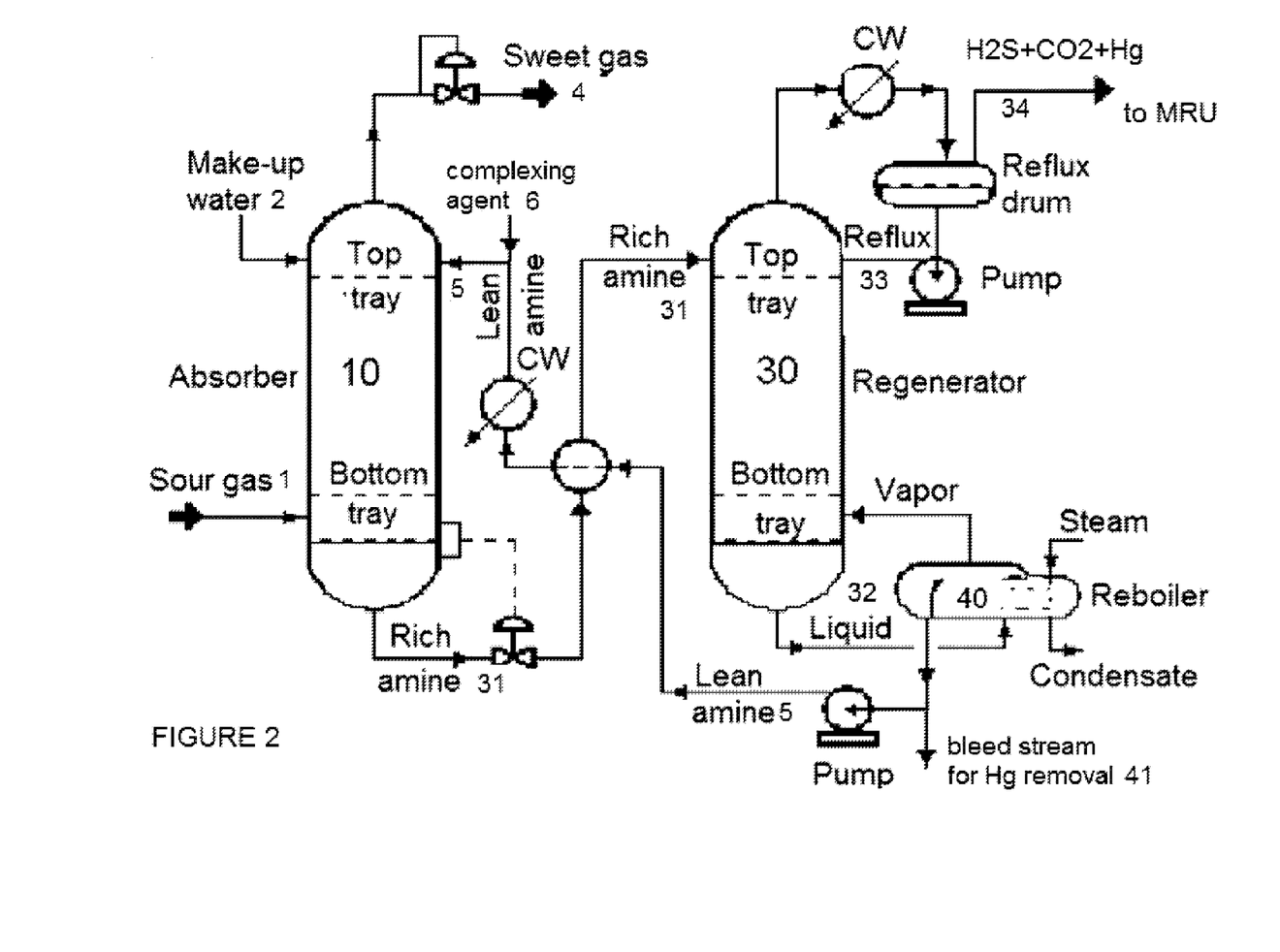
FIG. 2 is a diagram illustrating an embodiment of an amine unit.

Reference will be made to FIG. 2 of a diagram schematically illustrating an embodiment of a system and process for removing mercury from natural gas/flue gas (sour gas feed) in an amine unit.

In the FIG. 2, (lean) amine scrubbing solution 5 is used to remove acid gases from a sour gas feed 1 in absorber 10 generating a rich amine stream. As shown mercury complexing agent 6 is added to the lean scrubbing solution feed to the scrubber. Although not shown, mercury complexing agent can also be provided as any of a separate feed stream, part of the make-up water stream to the scrubber, or combinations thereof. In one embodiment (not shown), different complexing agents can be added to the amine unit as different feed streams. The mercury complexing agent(s) can be added continuously or intermittently. Sweetened gas stream 4 with reduced concentration of acid gas and mercury is removed from the scrubber for subsequent treatment with a glycol dehydrator (not shown). The rich amine solution 31 undergoes steam stripping in stripper 30 for the removal of weak acids such as $H_2S$ and $CO_2$ as overhead stream 34, wherein the stripping steam is generated from the amine solution in a reboiler 40 that takes its feed 32 from the regenerator tower below the steam stripping section.

In one embodiment, at least a portion of non-volatile mercury in the rich amine is also released from the amine solution in stripper 30 and/or reboiler 40 as volatile mercury that leaves the process with overhead stream 34. In one embodiment (not shown), the overhead stream is directed to a mercury removal unit, e.g., a mercury removal adsorbent bed, for the mercury to be removed by adsorption.

Condensing water from the effluent water/acid gas stream from the top of the regenerator helps minimize water usage. The steam stripping is not complete so residual $H_2S$ and $CO_2$ remain in the lean amine solution, along with some non-volatile mercury. Many of the acids that are not removed by steam stripping are called Heat Stable Salts (HSS) or, unless otherwise neutralized, Heat Stable Amine Salts (HSAS). Examples include but are not limited to formate, acetate, glycolate, propionate, oxalate, chloride, sulfate, thiosulfate, and thiocyanate. In one embodiment, a portion of the HSS is removed with at least a portion of the non-volatile mercury in the bleed stream 41.

EXAMPLES

The following illustrative examples are intended to be non-limiting.

Example 1

The Example was to investigate the retention of mercury in absorbents, a lean amine from a refinery acid gas scrubber was sampled and analyzed, and found to contain 250 ppb mercury. The lean amine was stripped with 300 cc/min nitrogen at room temperature for one hour. It was found that the mercury content of the lean amine was not changed. The lean amine was centrifuged at 1500 RPM for 10 minutes. The mercury content of the supernatant was analyzed and found to be unchanged.

In the next step, the lean amine containing mercury was filtered through a 0.2μ filter. The mercury content of the supernatant was analyzed and found to be unchanged. It is concluded that the mercury which is present in the lean amine is a non-volatile mercury species, and is not present in the form of large particles. Since this mercury species was found in the lean amine from the commercial unit, it was not decomposed to solids or volatile elemental mercury by the temperatures, pressures and residence times in the amine regeneration process.

Example 2

In this example, a sample of volatile $Hg^0$ was dissolved in white oil. This material is used to study the conversion of volatile mercury ($Hg^0$) into non-volatile mercury (HgS and other forms). First, five grams of elemental mercury $Hg^0$ was placed in an impinger at 100° C. and 0.625 SCF/min of nitrogen gas was passed over through the impinger to form an Hg-saturated nitrogen gas stream. This gas stream was then bubbled through 3123 pounds of Superla® white oil held at 60-70° C. in an agitated vessel. The operation continued for 55 hours until the mercury level in the white oil reached 500 ppbw by a Lumex™ analyzer. The simulated material was drummed and stored.

Example 3

In this example, volatile mercury was shown to be absorbed by an aqueous solution of sodium polysulfide. A gas containing volatile mercury was prepared by sparging nitrogen through the white oil of Example 2 and this gas was bubbled through a 10 wt % solution of sodium polysulfide at room temperature. Mercury was transferred from the white oil to the polysulfide solution. The mercury content of the stripped oil was reduced below the limit of detection, while >70% of the mercury initially in the oil was measured in the polysulfide solution. The extent of mercury capture in this bubbler experiment was not optimized, but the test showed the ability of complexing agents such as sodium polysulfide to capture mercury from a gas stream in a non-volatile form that is soluble in the polysulfide solution.

Examples 4-16

To study the conversion of volatile mercury to non-volatile mercury, 20 ml of the material from Example 2 was placed in a series of vials. The mercury analysis of the samples averaged 359 ppbw, indicating some loss of mercury over the years that the sample was stored.

A number of complexing agents were added to the vials and the initial mercury content was measured by Lumex™ mercury analyzer (detection limit of ~50 ppbw). A nylon stopper equipped with a small vent hole was place on top of each vial. The vials were then heated in an oil bath overnight. In the morning each vial is shaken. Then each vial was purged with $N_2$ for one hour at 90° C. with a gas flow to produce a steady bubbling (about 300 ml/hr). The final mercury content in each vial was then measured. The comparison of the initial and final mercury contents were used to judge the conversion of volatile elemental mercury into a non-volatile form (% Hg fixed). Results are summarized in Table 1. These complexing agents convert volatile mercury to a non-volatile form that would be removed from the treated gas when incorporated in an amine scrubber.

TABLE 1

| Example | Agent | Amount added | Temp. °C. | Time, Hrs | Final Hg, ppbw | % Hg Fixed |
|---|---|---|---|---|---|---|
| 4 | None | 0 | 90 | 24 | 0 | 0 |
| 5 | Di-Phenyl disulfide | 0.1 g | 90 | 24 | 20 | 6 |
| 6 | Di-n-propyl disufide | 0.1 ml | 90 | 24 | 0 | 0 |
| 7 | Di-tert-nonyl polysulfide | 0.1 ml | 90 | 24 | 2 | 1 |
| 8 | 1-Hexyl mercaptan | 0.1 ml | 90 | 24 | 243 | 68 |
| 9 | Thiophene | 0.1 ml | 90 | 24 | 0 | 0 |
| 10 | None | 0 | 90 | 72 | 0 | 0 |
| 11 | Di-Phenyl disulfide | 0.1 g | 90 | 72 | 48 | 13 |
| 12 | Di-n-propyl disufide | 0.1 ml | 90 | 72 | 0 | 0 |
| 13 | Di-tert-nonyl polysulfide | 0.1 ml | 90 | 72 | 3 | 1 |
| 14 | 1-Hexyl mercaptan | 0.1 ml | 90 | 72 | 240 | 67 |
| 15 | Thiophene | 0.1 ml | 90 | 72 | 23 | 7 |
| 16 | 1-Hexyl mercaptan | 0.1 ml | 20 | 24 | 10 | 3 |

Example 17

In a three-neck flask with a Teflon stirrer (as glass reactor) was placed a 200 ml of solution of stannous chloride and sulfuric acid, for a concentration of 10% stannous chloride and 5% sulfuric acid. When mercury vapors were to be generated, 0.5 cc of a 209.8 ppm Hg solution of mercuric chloride in water was injected into the reactor via a septum. The stannous chloride rapidly reduced the mercury to elemental mercury. In the glass reactor was a line carrying 300 cc/min of nitrogen which bubbled in the reducing acidic stannous chloride solution. This was used to sweep the evolved elemental mercury to the downstream absorbers.

The glass reactor was connected to two absorbers in series, each of which contained 200 ml of solution. The absorbers were equipped with a glass frit to produce small bubbles. The bubbles contacted the absorbing solution for about one second. The first absorber contained the test solution. The second contained 3% sodium polysulfide in water. The 3% sodium polysulfide solution was prepared by dilution of a 30% solution of sodium polysulfide. This second absorber was a scrubber to remove the last traces of mercury from the nitrogen to provide mercury mass closures. Analysis of the exit gas from the second absorber by both Lumex and Jerome techniques found no detectable mercury.

Samples of the liquids in the reactor and two absorbers and gas leaving the reactor and leaving the two absorbers were drawn at periodic intervals over a ninety-minute period and analyzed for mercury by Lumex. Mercury balances over 57 runs average 98.6%. The reaction of the mercury chloride in the three neck flask is rapid, and the elemental mercury was stripped rapidly as well. After a typical ninety-minute period the conversion and displacement of mercury in the reactor averaged 94%.

The efficiency of the test solutions was calculated by comparing the amount of mercury taken up in the first reactor absorber to the amount taken up in both absorbers. If no mercury was taken up in the first reactor with the test solution, the efficiency was zero percent. If all the mercury was taken up in the first reactor, the efficiency was 100%. At the end of the experiments no evidence of precipitated HgS was observed in the absorbers. The solutions were clear.

Examples 18-21

The experiments were to evaluate the Hg uptake in various solutions without the complexing agent according to the procedures in Example 17. The results are shown in Table 2. A 56% MEG solution was prepared by mixing 56 wt. % monoethylene glycol (MEG) in DI water. MEG solutions are typically used to prevent the formation of hydrates in gas pipelines that also contain water. A 45% MDEA solution was prepared by mixing 45 percent Methyl diethanolamine in DI water. MDEA solutions are typically used in acid gas scrubbers which remove hydrogen sulfide, carbon dioxide and other acidic gases from natural gas. 100% TEG was pure triethylene glycol. TEG is used to dehydrate gases.

TABLE 2

| Example | Solvent | Efficiency % |
|---|---|---|
| 18 | DI Water | 0 |
| 19 | 56% MEG | 0 |
| 20 | 45% MDEA | 0 |
| 21 | 100% TEG | 0 |

These results show that insignificant amounts of mercury were absorbed (0% efficiency) and retained in the test solutions in the absence of mercury capture agents.

Examples 22-38

These experiments are to evaluate sodium polysulfide as complexing agent in the removal of mercury. Sodium polysulfide is highly effective in capturing elemental mercury vapors at 1 second of contact, even when the sulfur to mercury stoichiometric ratio is near 2. Sodium polysulfide was added in varying amounts to the four solvents as listed and tested according to the procedure of example 17. Results are shown in Table 3.

TABLE 3

| Example | Solvent | ppm Na$_2$S$x$ | S/Hg Molar ratio | Efficiency % |
|---|---|---|---|---|
| 22 | 100% TEG | 36 | 0.429 | 37.99 |
| 23 | 100% TEG | 179 | 2.143 | 88.93 |
| 24 | 100% TEG | 357 | 4.286 | 78.04 |
| 25 | 100% TEG | 1,786 | 21.429 | 83.13 |
| 26 | 100% TEG | 3,571 | 42.858 | 81.63 |
| 27 | 45% MDEA | 357 | 4.286 | 38.01 |
| 28 | 45% MDEA | 1,786 | 21.429 | 76.86 |
| 29 | 45% MDEA | 3,571 | 42.858 | 79.48 |
| 30 | 56% MEG | 36 | 0.214 | 17.74 |
| 31 | 56% MEG | 179 | 1.071 | 30.15 |
| 32 | 56% MEG | 357 | 2.143 | 31.15 |
| 33 | 56% MEG | 357 | 4.286 | 46.92 |
| 34 | 56% MEG | 893 | 10.714 | 67.91 |
| 35 | 56% MEG | 3,571 | 42.858 | 82.49 |
| 36 | DI Water | 357 | 4.286 | 25.81 |
| 37 | DI Water | 893 | 10.714 | 33.76 |
| 38 | DI Water | 3,571 | 42.858 | 60.31 |

Examples 39-62

These experiments are to evaluate ammonium polysulfide as complexing agent in the removal of mercury. Ammonium polysulfide and sodium polysulfide are both used in refineries to control cyanides and to moderate corrosion. If ammonium polysulfide is used then the sodium cation can be avoided, such as in amine absorbers. Using the transient method of example 17, the efficiency of ammonium polysulfide in various solvents was explored and results are shown in Table 4.

TABLE 4

| Example | Solvent | Temperature | ppm (NH4)2S$x$ | S/Hg Molar ratio | Efficiency % |
|---|---|---|---|---|---|
| 39 | 100% TEG | Room T | 2,429 | 32.424 | 86.18 |
| 40 | 100% TEG | Room T | 243 | 3.242 | 65.45 |
| 41 | 45% MDEA | Room T | 2,429 | 33.510 | 42.09 |
| 42 | 45% MDEA | Room T | 243 | 3.351 | 31.97 |
| 43 | 56% MEG | Room T | 2,429 | 33.510 | 68.86 |
| 44 | 56% MEG | Room T | 243 | 3.351 | 47.58 |
| 45 | DI Water | Room T | 2,429 | 33.510 | 70.49 |
| 46 | DI Water | Room T | 243 | 3.351 | 39.05 |
| 47 | DI Water | 70° C. | 2,429 | 33.510 | 68.55 |
| 48 | DI Water | 70° C. | 243 | 3.351 | 55.44 |

Samples of the solution in the first absorber were filtered through a 0.45μ filter and analyzed for mercury. Within the limits of the Lumex technique there was no significant change in the mercury content. This demonstrated that the mercury was absorbed as a solution and was not forming measurable amounts of HgS precipitate (e.g., less than 50 ppb difference in the concentration of the original and the filtered solutions).

Examples 49-56

The experiments are to evaluate the removal of aqueous Hg anions by ion exchange and adsorption, showing that anion mercury can be removed by anion exchange resins or adsorbents. The 10 ml of a solution containing anionic mercury were contacted with approximately 0.1 grams of various adsorbents to study the removal of mercury. The solution was a 56% MEG solution in water with 2439 ppm ammonium polysulfide and 267 ppb mercury. The adsorbents were Darco Carbon (Aldrich 242276), Activated Carbon (Aldrich C2889), and various Siemen's anion exchange resins: A-244OH, A-464OH, A-674OH, A-714OH, and A-284C Resins. The solutions and the solid adsorbents were mixed overnight at room temperature on a rotating wheel, and the mercury content of the aqueous solution was determined in the morning along with the mercury content of the adsorbent. The results are shown in Table 5:

TABLE 5

| Example | Adsorbent | Solution Hg, ppb | Adsorbent Hg, ppb | % Removed |
|---|---|---|---|---|
| 49 | None | 299 | — | 0.00 |
| 50 | Darco Carbon | 1.97 | 11,600 | 99.34 |
| 51 | Act. Carbon | 129 | — | 56.86 |
| 52 | A-244OH Resin | 0.53 | 27,150 | 99.82 |
| 53 | A-464OH Resin | 0.43 | 36,200 | 99.86 |
| 54 | A-674OH Resin | 0.89 | 28,900 | 99.70 |
| 55 | A-714OH Resin | 156 | 15,900 | 47.83 |
| 56 | A-284C Resin | 0.3 | 21,400 | 99.90 |

The efficiency of various oxygen scavengers was evaluated by use of the procedure described in example 17. In each of the following examples, 243 ppm of ammonium polysulfide (APS) was dissolved in a 56% solution of monoethylene glycol in deionized water. Tests were performed at room temperature and the results are summarized in Table 6.

TABLE 6

| Example | Composition | Result |
|---|---|---|
| 57 | 243 ppm APS Only | 44.16 |
| 58 | APS + Hydroxylamine HCl | 10.16 |
| 59 | APS + sodium bisulfite | 11.91 |
| 60 | APS + sodium dithionite | 38.99 |
| 61 | APS + Hydrazine sulfate | 52.24 |
| 62 | APS + N,N Diethylhydroxylamine | 63.50 |
| 63 | APS + Guanidine HCl | 68.74 |
| 64 | APS + Acetaldehyde Oxime | 79.18 |
| 65 | APS + D-(-)-Isoascorbic Acid | 81.61 |

Example 57 contained ammonium polysulfide only and is a reference. Examples 58 and 59 show that hydroxylamine and sodium bisulfate suppress the ability of ammonium polysulfide to capture mercury. In contrast examples 60 to 65 show that other oxygen scavengers do not suppress the ability of polysulfides to capture mercury and some increase its ability. These are examples of compatible oxygen scavengers.

For the purposes of this specification and appended claims, unless otherwise indicated, all numbers expressing quantities, percentages or proportions, and other numerical values used in the specification and claims are to be understood as being modified in all instances by the term "about." Accordingly, unless indicated to the contrary, the numerical parameters set forth in the following specification and attached claims are approximations that can vary depending upon the desired properties sought to be obtained by the present invention. It is noted that, as used in this specification and the appended claims, the singular forms "a," "an," and "the," include plural references unless expressly and unequivocally limited to one referent.

As used herein, the term "include" and its grammatical variants are intended to be non-limiting, such that recitation of items in a list is not to the exclusion of other like items that can be substituted or added to the listed items. The terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Unless otherwise defined, all terms, including technical and scientific terms used in the description, have the same meaning as commonly understood by one of ordinary skill in the art to which this invention belongs.

This written description uses examples to disclose the invention, including the best mode, and also to enable any person skilled in the art to make and use the invention. The patentable scope is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims. All citations referred herein are expressly incorporated herein by reference.

The invention claimed is:

1. A method for removing a trace amount of mercury in a natural gas feed, comprising:
   providing a gas feed containing a first concentration of volatile mercury and acid gases;
   contacting the gas feed in an absorber with an absorption solution comprising lean amine and a first complexing agent comprising volatile cations selected from ammonium polysulfide, amine polysulfides, and sulfanes, wherein the absorption solution concurrently removes mercury and non-volatile mercury and acid gases from the gas feed;
   generating a rich amine solution containing acid gases and at least 50% of the volatile mercury in the gas feed as non-volatile mercury and a treated gas stream with a second concentration of acid gases and mercury.

2. The method of claim 1, further comprising:
   contacting the treated gas stream with a glycol solution in a dehydrator, wherein the glycol solution contains a second complexing agent for the glycol solution to concurrently remove mercury and water vapor from the treated gas stream,
   generating a rich glycol containing non-volatile mercury and a dehydrated gas stream with a reduced concentration of water and a third concentration of mercury, wherein the third concentration of mercury is less than 50% of the second concentration of mercury.

3. The method of claim 2, further comprising:
   removing the non-volatile mercury from the rich glycol by at least one of filtration, centrifugation, precipitation, stripping, distillation, adsorption, ion exchange, electrodialysis, a hydrocarbon steam and separation step, and combinations thereof,
   generating a recycled glycol stream having a reduced concentration of mercury of less than 50% of the non-volatile mercury in the rich glycol.

4. The method of claim 1, wherein the lean amine in the absorption solution is selected from monoethanolamine (MEA), diethanolamine (DEA), methyldiethanolamine (MDEA), aminoethoxyethanol(diglycoamine) (DGA), triethanolamine (TEA), diisopropylamine (DIPA) and mixtures thereof.

5. The method of claim 1, wherein the absorption solution comprising lean amine has a concentration of amine ranging from 15 to 65 wt. %.

6. The method of claim 1, wherein the volatile cation is ammonium polysulfide.

7. The method of claim 1, wherein at least 90% of volatile mercury is removed from the gas feed in the absorption solution.

8. The method of claim 7, wherein at least 95% of volatile mercury is removed from the gas feed in the absorption solution.

9. The method of claim 1, wherein the treated gas stream contains less than 100 $\mu g/Nm^3$ mercury.

10. The method of claim 9, wherein the treated gas stream contains less than 10 $\mu g/Nm^3$ mercury.

11. The method of claim 10, wherein the treated gas stream contains less than 1 $\mu g/Nm^3$ mercury.

12. The method of claim 11, wherein the treated gas stream contains less than 0.1 $\mu g/Nm^3$ mercury.

13. The method of claim 1, wherein the complexing agent is added in an amount of less than 5 vol. % of the absorption solution to the absorber.

14. The method of claim 13, wherein the complexing agent is added in an amount of less than 1 vol. % of the absorption solution to the absorber.

15. The method of claim 14, wherein the complexing agent is added in an amount of less than 0.5 vol. % of the absorption solution to the absorber.

16. The method of claim 1, further comprising:
    heating the rich amine solution containing acid gases and non-volatile mercury in a solvent regeneration process employing at least a stripper and a reboiler, and
    generating a lean amine containing non-volatile mercury for recycle in an absorber to remove acid gases.

17. The method of claim 16, further comprising:
    treating the lean amine to remove the non-volatile mercury by any of filtration, centrifugation, precipitation, reduction to elemental mercury followed stripping, distillation, adsorption, ion exchange, electrodialysis, transfer to a hydrocarbon steam and separation, and combinations thereof.

18. The method of claim 1, wherein the glycol solution further comprises at least one of an anti-foam, a demulsifier, a compatible oxygen scavenger, and mixtures thereof.

19. The method of claim 18, wherein the demulsifier is selected from polyamines, polyamidoamines, polyimines, condensates of o-toluidine and formaldehyde, quaternary ammonium compounds, ionic surfactants, polyoxyethylene alkyl phenols, aromatic sulfonic acid additive, and mixtures thereof.

20. The method of claim 18, wherein the oxygen scavenger is selected from the group of hydrazine salts, guanidine salts, N,N-Diethylhydroxylamine, oximes, dithionites, ascorbic acid, and isoascorbic acid, and mixtures thereof.

21. The method of claim 18, wherein the anti-foam agent is a silicone material.

22. A method for removing a trace amount of mercury in a gas feed, comprising:
    providing a gas feed containing a first concentration of volatile mercury and acid gases; and
    contacting the gas feed in an absorber with an absorption solution comprising lean amine and a complexing agent, generating a treated gas stream with a reduced concentration of acid gases and mercury, wherein the absorption solution concurrently removes mercury and acid gases from the gas feed for a rich amine solution containing mercury and acid gases, wherein the complexing agent is selected from ammonium polysulfide, amine polysulfides, calcium polysulfide, sulfanes, and mixtures thereof;
    heating the rich amine solution containing acid gases and mercury in a solvent regeneration process employing at least a stripper and a reboiler, wherein at least a portion of the mercury is removed from the rich amine with acid gases as an overhead stream; and treating the overhead stream containing mercury by adsorption in a mercury removal adsorbent bed.

* * * * *